United States Patent [19]

Chang

[11] Patent Number: 5,223,763
[45] Date of Patent: Jun. 29, 1993

[54] WIND POWER GENERATOR AND VELOCIMETER

[75] Inventor: David B. Chang, Tustin, Calif.
[73] Assignee: Hughes Aircraft Company, Los Angeles, Calif.
[21] Appl. No.: 661,977
[22] Filed: Feb. 28, 1991
[51] Int. Cl.$^5$ .............................................. H01L 41/08
[52] U.S. Cl. .................... 310/339; 73/861.22
[58] Field of Search .......... 73/861.22, 861.24, 861.23; 310/338, 339

[56] References Cited

U.S. PATENT DOCUMENTS

| | | | |
|---|---|---|---|
| 3,645,132 | 2/1972 | Rasmussen | 73/861.22 |
| 3,810,388 | 5/1974 | Cousins et al. | 73/861.22 |
| 3,818,877 | 6/1974 | Barrera et al. | 73/861.23 |
| 4,418,579 | 12/1983 | Harrington | 73/861.23 |
| 4,442,372 | 4/1984 | Roberts | 310/339 |
| 4,455,877 | 6/1984 | Blechinger et al. | 73/861.22 |
| 4,467,236 | 8/1984 | Kolm et al. | 310/339 |
| 4,703,659 | 11/1987 | Lew et al. | 73/861.24 |
| 5,039,901 | 8/1991 | Newbould | 310/339 |

FOREIGN PATENT DOCUMENTS

| | | | |
|---|---|---|---|
| 9013007 | 11/1990 | European Pat. Off. | 73/861.22 |
| 0055559 | 5/1977 | Japan | 73/861.23 |
| 0014114 | 2/1981 | Japan | 73/861.24 |
| 0054809 | 4/1982 | Japan | 73/861.24 |
| 0066314 | 4/1982 | Japan | 73/861.23 |

Primary Examiner—Mark O. Budd
Assistant Examiner—Thomas M. Dougherty
Attorney, Agent, or Firm—Georgann S. Grunebach; Michael W. Sales; Wanda K. Denson-Low

[57] ABSTRACT

An apparatus and method are disclosed for producing electrical power from wind flow. The apparatus includes a conduit (13) with a variably sloped wall (59) for channeling the wind flow along a predetermined path (23), a baffle (25) positioned in the path of the flow for forming vortices (27-33) in the flow, and a plurality of piezoelectric transducers (35-45) positioned in sequence, each positioned a predetermined distance from the other, in the path of the flow for producing electrical output signals in response to pressure applied by the vortices upon the transducers. The individual output signals are combined to produce an aggregate power output. The system also includes a frequency counter (61) responsive to the output signal of at least one transducer for determining wind velocity. The method employed by the system includes the steps of channeling the wind flow along a predetermined path, forming vortices in the flow by positioning a baffle in the path of the flow and by varying the slope of the wall (and hence, the flow) so that the Reynold's Number representative of the flow is in the range from 40 to 300, conducive to formation of vortices, and positioning the transducers in the path of the vortices for producing electrical power in response to pressure from the vortices upon the transducers.

24 Claims, 2 Drawing Sheets

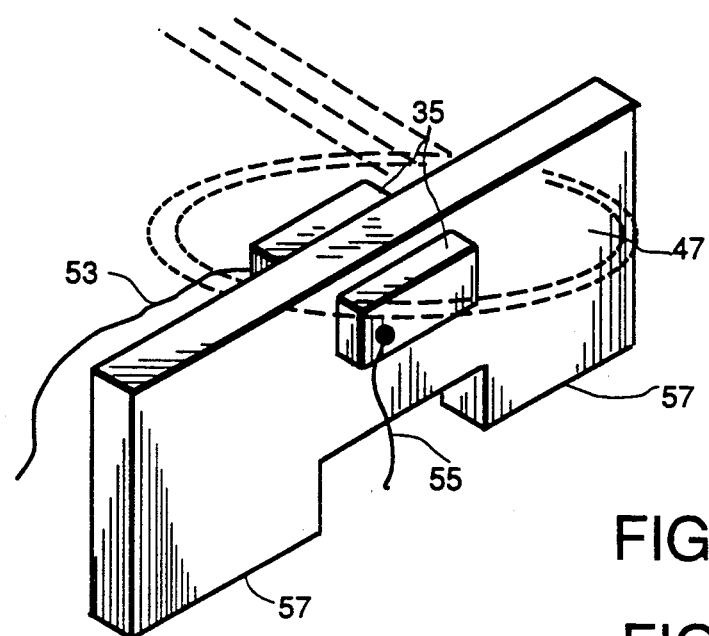
FIG. 3.
FIG. 4.
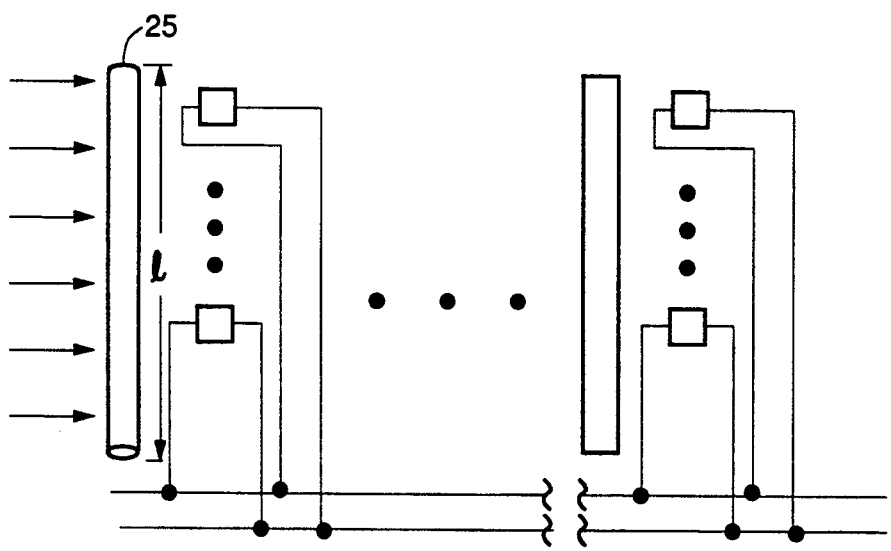
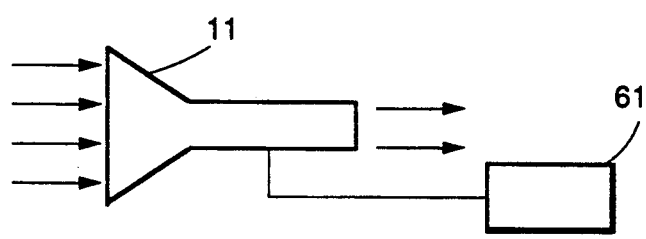
FIG. 5a.
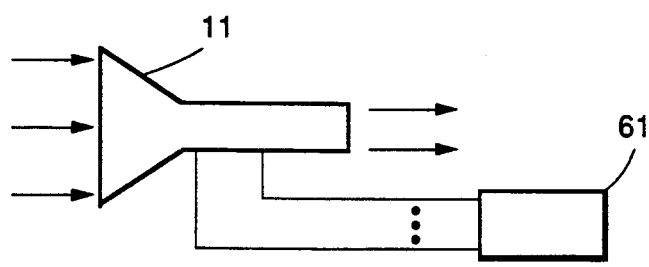
FIG. 5b.

WIND POWER GENERATOR AND VELOCIMETER

BACKGROUND OF THE INVENTION

This invention relates to conversion of fluid flow to electricity generally, and particularly to piezoelectric transducer devices for converting wind flow to AC (alternating current) power and for determining wind velocity.

Piezoelectric materials have been used to generate electrical power from wind action. One such system is described, for example, in U.S. Pat. No. 4,536,674 entitled Piezoelectric Wind Generator, issued Aug. 20, 1985 to V. Hugo Schmidt. Another such system is described in U.S. Pat. No. 3,239,678 entitled Piezoelectric Power System, issued Mar. 8, 1966 to C. Kolm et al. In many such prior systems, fluid flow pressures (e.g., pressures applied to piezoelectric materials by wind flow, or by flow of exhaust gases) had to be substantial in order to provide adequate power generation. Such systems generally were not able to generate power at lesser fluid pressures.

Also, some prior systems generate AC power by rotational action, employing windmill or turbine-like blades for driving wire loops and cutting magnetic field lines. Such systems are generally bulky, however, and entail substantial wear and tear because of their rotational motion.

Further, many such power generation systems do not provide related information such as fluid flow velocity. Many such prior systems (e.g., pressure-actuated systems or devices such as the Pitot tube) measure fluid velocity by applying the Bernoulli principle, i.e., $$P + \tfrac{1}{2}\rho V^2 = \text{constant}$$

where P represents the pressure exerted by the fluid, $\rho$ represents the fluid's density, and v represents the velocity of the fluid. A change in density is represented as:

$$\delta\rho = \frac{-4\rho}{v} \delta v$$

and a change in velocity is represented as:

$$\delta v = \frac{-v}{4\rho} \delta\rho$$

However, such prior systems often do not distinguish between pressure changes that are due to density changes and pressure changes that are due to velocity changes. When such devices experience a pressure change ($\delta P$), they sometimes erroneously interpret the pressure change as due to a velocity change ($\delta v$) when, in fact, the pressure change may be due to a change in density ($\delta\rho$). Such prior systems are unreliable and error prone. For example, given a fluid velocity v = 500 miles per hour and the value $$\frac{\partial\rho}{\rho} = 10^{-1},$$

such Bernocilli type velocimeter devices would produce a velocity error $$\delta v = -\frac{500}{4} \times 10^{-1}$$

or $-12.5$ miles per hour.

What is needed and would be useful, therefore, is a more efficient power generation system which could operate without substantial rotational wear and tear, and which could provide accurate wind velocity measurements.

SUMMARY OF THE INVENTION

An efficient electrical power generation apparatus is provided which is capable of operating at low wind pressures, without rotational wear and tear. The apparatus is also capable of providing accurate wind velocity measurements.

According to a first aspect of the invention, the apparatus includes a conduit member receptive of wind flow for channeling the flow along a predetermined path, a baffle member disposed in the path of the wind flow and shaped to form vortices in the wind flow, and a plurality of piezoelectric transducers disposed in the path of the wind flow for producing an electrical output signal in response to stress created in the transducers by the vortices The conduit member includes a wall with a variable slope for varying the fluid flow so that the Reynold's Number representative of the fluid flow at the baffle is in the range from 40 to 300, conducive for formation of vortices.

The apparatus also includes a frequency counter responsive to the output signal of at least one transducer for determining wind velocity.

According to a second aspect of the invention, a method is disclosed for producing electrical power from wind flow comprising the steps of channeling the wind flow along a predetermined path, forming vortices in the flow by positioning a baffle in the path of the flow and by varying the flow so that the Reynold's Number representative of the flow is in the range from 40 to 300, and positioning a plurality of transducers in sequence in the path of the vortices for producing electrical power in response to pressure from the vortices upon the transducers.

BRIEF DESCRIPTION OF THE DRAWINGS

FIG. 3 is an auxiliary view of selected transducers mounted on a flexible support (member) in the apparatus of FIG. 1;

FIG. 4 is a diagrammatic illustration of multiple transducers, included in the apparatus of FIG. 1, whose output are combined, in parallel, to produce an aggregate output (power); and FIGS. 5A-B are block diagrams showing the power generation apparatus of FIG. 1 combined with a frequency counter for determining wind velocity in response to output from one or two transducers of the power generation apparatus.

DESCRIPTION OF THE PREFERRED EMBODIMENT

Figure 1:
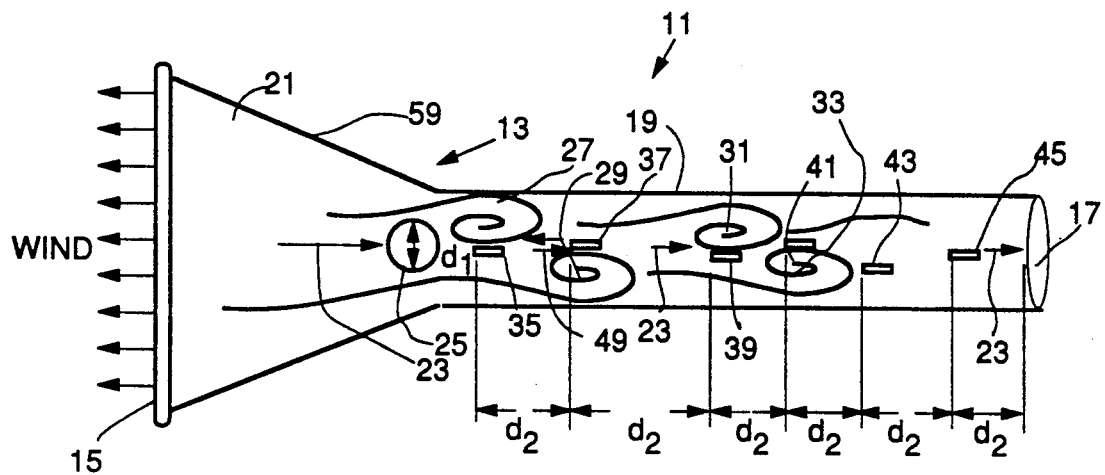
FIG. 1 is a graphic illustration of the apparatus of the present invention for power generation.

Referring now to FIG. 1, there is shown an apparatus 11 of the present invention. The apparatus 11 includes a housing or conduit 13 with a first opening 15 at one end and a second opening 17 at another end for passage of fluid (e.g., wind) therethrough. The conduit 13 comprises a cylindrical portion 19, and a cone-shaped portion 21 for channeling (guiding) the wind along a predetermined path 23.

The apparatus 11 also includes a baffle or other obstacle 25 placed (disposed) in the path 23 for creating vortices 27–33 along said path. (The vortices represent a Karman vortex street which appears behind the baffle at Reynolds Numbers greater than forty.) The baffle 25 may be cylindrical, with a diameter "$d_1$", and a longitudinal axis of length "l" (FIG. 4).

The apparatus 11 further includes a plurality of piezoelectric transducers 35–45 arranged in series, each positioned downstream from the baffle at a successively greater distance from the baffle (vortex source). Each transducer is disposed a uniform distance ($d_2$) from the other (i.e., from its neighbour) along the length of cylindrical housing 19.

Figure 2:
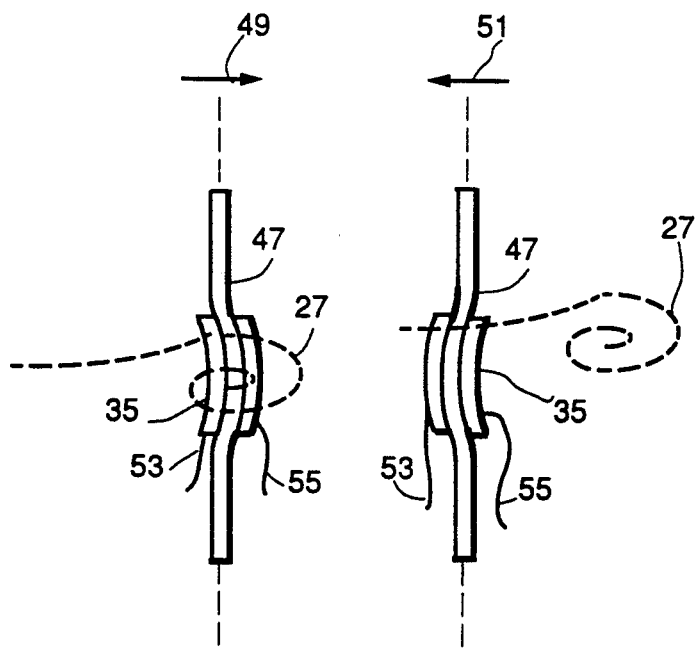
FIG. 2 is a diagrammatic illustration of the actions of selected transducers of the apparatus of FIG. 1.

As shown with respect to transducer 35 in FIGS. 2 and 3, each transducer 35–45 is mounted on a flexible member 47 (e.g., a metal strip) to facilitate vibration in synchronism (periodically) with passage of the vortices 27–35 produced by baffle 25. As indicated in FIG. 2 with respect to passage of vortex 27, the transducer 35 is stressed in one direction 49 in response to pressure applied by the vortex upon the transducer, then stressed in another direction 51 upon rebound of the transducer after passage of the vortex. In response to such alternating stresses, the transducer outputs an AC (alternating current) signal via leads 53,55. The periodic pressure (stress) resulting from the vortices are therefore directly translated into AC voltage by the piezoelectric transducers.

The leads 53,55 are affixed to the transducer by conventional means. The transducers are mounted on the flexible members 47 by an appropriate adhesive or fastener (e.g., epoxy). As shown in FIG. 3, the bases 57 of each of the flexible members 47 are mounted onto the inside wall of cylinder 19 by an appropriate adhesive or fastener such as epoxy.

The wall 59 of the cone-shaped housing 21 (FIG. 1) may be constructed from conventional, flexible bellows-type material. The slope or angle ($\alpha$) of the wall 59 may be varied to control (change) the Reynolds Number and, hence, the period of the output signal, as explained below. The Reynolds Number (R) may be expressed as follows:

$$R = \frac{\rho}{\eta} V d_1$$

where $\rho$ represents the density of the fluid (e.g., gas or air), $\eta$ represents the viscosity of the fluid, $d_1$ represents the diameter of the obstacle or baffle 25, and V represents the velocity of the fluid.

When R is $\leq 40$, the flow is regarded as being laminar; when R is $> 300$, the flow is regarded as chaotic and irregular. When $40 < R < 300$, the flow is regarded as suitable for vortex formation. At such Reynolds Numbers suitable for vortex formation, the fluid flow behind (downstream from) the baffle (obstacle) becomes periodic, producing a periodically varying pressure on the transducers, resulting in the generation of an AC voltage signal. The Reynolds Number and, hence, the frequency of the generated voltage, may be controlled by varying the angle $\alpha$ representing the slope of the wall 59 of the housing 13.

FIG. 4 shows the outputs of the various transducers, and how they may be added (in parallel) to produce an aggregate output.

FIGS. 5A and 5B show how the apparatus 11 may be coupled to a frequency counter 61 to form a velocimeter. As depicted in FIG. 5A, the frequency counter 61 determines (measures) the frequency of the output signal produced by a transducer (in response to the propagation of two or more vortices past the transducer), and calculates the fluid's (wind's) velocity (V) as follows:

$$V = df$$

where d represents the distance between vortices. The distance d is porportional to the diameter d, of the baffle, and may be determined during calibration of the apparatus.

In the case where the apparatus 11 includes at least two transducers, as indicated in FIG. 5B, wind velocity (V) is calculated by the frequency counter 61 as follows:

$$v = \frac{d_2}{t}$$

where $d_2$ represents the predetermined distance between two adjacent (successive) transducers (as shown in FIG. 1), and t represents the time (period) of transit of a vortex between the two adjacent transducers.

While the fundamental features of the invention have been shown and described, it should be understood that various substitutions, modifications, and variations may be made by those skilled in the art without departing from the spirit or scope of the invention. Accordingly, all such modifications and variations are included within the scope of the invention as defined by the following claims.

What is claimed is:

1. An electrical power generating apparatus comprising:

a conduit receptive of fluid flow for channeling the fluid flow along a predetermined pat wherein said conduit has a fluid flow input section and a flow region constructed to maintain laminar fluid flow;

baffle means disposed in said conduit in the path of said laminar fluid flow and shaped to form vortices in said fluid flow; and a plurality of piezoelectric transducers disposed axially within said flow region in the path of said laminar fluid flow for producing an electrical signal in response to stress created in said transducers by said vortices, wherein a portion of said baffle means is cylindrically shaped, said portion having a predetermined diameter and a longitudinal axis disposed perpendicular to the predetermined path, and wherein said predetermined diameter is selected such that the Reynold's number representative of fluid flow at the baffle is in the range from 40 to 300.

2. The apparatus as in claim 1 wherein said conduit means is cylindrically shaped, and has a first opening at one end and a second opening at an opposite end, the diameter of at least one of said openings being variable.

3. The apparatus as in claim 1 wherein said piezoelectric transducers are arranged in series in the direction of fluid flow, with adjacent transducers positioned a selected uniform distance from each other, enabling each vortex to impact successive transducers as it flows past each transducer in the series.

4. The apparatus as in claim 3 wherein output signals from the piezoelectric transducer means are produced in parallel, and added to produce an aggregate power output.

5. The apparatus as in claim 4 wherein said fluid is liquid.

6. The apparatus as in claim 4 wherein said fluid is a gas.

7. The apparatus as in claim 4 wherein said power is alternating current power.

8. The apparatus as in claim 5 wherein said liquid is water.

9. The apparatus as in claim 6 wherein said gas is air.

10. An apparatus for measuring the velocity of fluid flow comprising:
   conduit means receptive of the fluid flow for channeling said fluid flow along a predetermined path;
   a rod-like baffle disposed transversely in the path of said fluid flow, for forming a plurality of vortices in said fluid flow; and
   a plurality of piezoelectric transducer means disposed in the path of said fluid flow periodic distances form said baffle and each other, said distances determined by the Reynold's number associated with said baffle, said transducer means for producing successive output signals in response to said vortices, the frequency of the signals having a determinable relationship to the velocity of fluid flow.

11. An electrical power generating apparatus comprising:
   conduit means receptive of fluid flow for channeling said fluid flow along a predetermined path, wherein said conduit means includes a wall with a changeable slope for varying said fluid flow;
   baffle means disposed in the path of said fluid flow and shaped to form vortices in said fluid flow; and
   a plurality of piezoelectric transducer means disposed in the path of said fluid flow for producing an electrical signal in response to stress created in said transducer means by said vortices, wherein a portion of said baffle means is cylindrically shaped, said portion having a predetermined diameter and a longitudinal axis disposed perpendicular to the predetermined path, and wherein said predetermined diameter and said slope are selected such that the Reynold's number representative of fluid flow at the baffle is in a range from 40 to 300.

12. The apparatus as in claim 11 wherein said conduit means includes a cone-shaped conduit portion.

13. The apparatus as in claim 10 including means connected to said piezoelectric transducer means for receiving said output signals, determining said frequency and calculating the velocity of fluid flow.

14. An apparatus as in claim 10 wherein said conduit means includes a conical fluid flow input end.

15. An apparatus for measuring the velocity of fluid flow comprising:
   elongated conduit means receptive of the fluid flow for channeling said fluid along a predetermined, axial path;
   baffle means shaped, and disposed within said conduit means in the path of said fluid flow, for forming a vortex in said fluid flow; and
   at least a first and a second piezoelectric transducer means, said first piezoelectric transducer means axially disposed a predetermined first distance from said baffle means, and said at lest two piezoelectric transducer means axially disposed a predetermined second distance form each other in the path of said fluid flow, said distances being determined by the Reynold's number associated with said baffle means.

16. The apparatus as in claim 15 including a means connected to said at least first and second transducer means for receiving said first and second output signals and for determining a period and calculating the velocity of fluid flow.

17. The apparatus as in claim 15 wherein said fluid is liquid.

18. The apparatus as in claim 15 wherein said fluid is a gas.

19. The apparatus as in claim 15 wherein said output signals are alternating current signals.

20. The apparatus as in claim 17 wherein said liquid is water.

21. The apparatus as in claim 18 wherein said gas is air.

22. A method of producing electrical power form fluid flow, the method comprising the steps:
   channeling the fluid flow along a predetermined path which changes from an entry region to a laminar flow region which is more constricted than the entry region;
   forming vortices in said laminar fluid flow; and
   positioning a plurality of transducers in sequence, each positioned a predetermined distance from the other, in the path of said vortices of producing electrical power in response to pressure applied by said vortices on said transducers, where the step of forming vortices includes the step of positioning a baffle in the path of said laminar fluid flow.

23. The method of claim 22 wherein the step of forming vortices further includes the step of varying the fluid flow so that the Reynold's Number representative of the fluid flow is in the range from 40 to 300, conducive for formation of vortices in said flow.

24. The method of claim 23 where a conduit with a predetermined slope is used in channeling the fluid flow, said conduit having an entry portion and a second portion, said entry portion having a cone shape with a predetermined slope relative to said second portion, and the step of varying said flow includes the step of varying said slope.

* * * * *